(12) United States Patent
Lim et al.

(10) Patent No.: US 11,733,947 B2
(45) Date of Patent: Aug. 22, 2023

(54) MANAGING UNRESOLVED JOBS OF DEVICES WITH CLOUD SERVER

(71) Applicant: HEWLETT-PACKARD DEVELOPMENT COMPANY, L.P., Spring, TX (US)

(72) Inventors: Yeonjung Lim, Seongnam-si (KR); Giwon Seo, Seongnam-si (KR); Jeongho Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 51 days.

(21) Appl. No.: 17/606,940

(22) PCT Filed: May 20, 2020

(86) PCT No.: PCT/US2020/033737
§ 371 (c)(1),
(2) Date: Oct. 27, 2021

(87) PCT Pub. No.: WO2021/118632
PCT Pub. Date: Jun. 17, 2021

(65) Prior Publication Data
US 2022/0206728 A1    Jun. 30, 2022

(30) Foreign Application Priority Data
Dec. 13, 2019 (KR) .......... 10-2019-0166763

(51) Int. Cl.
*G06F 3/12* (2006.01)
*H04W 12/06* (2021.01)

(52) U.S. Cl.
CPC .......... *G06F 3/1267* (2013.01); *G06F 3/1204* (2013.01); *G06F 3/1207* (2013.01); *G06F 3/1222* (2013.01); *G06F 3/1238* (2013.01); *G06F 3/1274* (2013.01); *G06F 3/1285* (2013.01); *H04W 12/06* (2013.01)

(58) Field of Classification Search
None
See application file for complete search history.

(56) References Cited

U.S. PATENT DOCUMENTS

| 9,594,895 B2 | 3/2017 | Fukuda |
| 2009/0033992 A1* | 2/2009 | Ogiwara ............... G06F 21/608 358/1.15 |
| 2014/0368865 A1 | 12/2014 | Gutnik et al. |

(Continued)

FOREIGN PATENT DOCUMENTS

| JP | 20170001280 A | 1/2017 |
| JP | 20170173932 A | 9/2017 |

(Continued)

*Primary Examiner* — Thomas D Lee
(74) *Attorney, Agent, or Firm* — Brooks, Cameron & Huebsch, PLLC

(57) ABSTRACT

An example operation method includes receiving unresolved job information about a job, requested by user identification information, from a first device, storing the unresolved job information in user data of the user identification information, receiving the user identification information from a second device, from the second device, and providing the unresolved job information stored in the user data to the second device.

13 Claims, 13 Drawing Sheets

(56) References Cited

U.S. PATENT DOCUMENTS

| | | | |
|---|---|---|---|
| 2015/0116755 A1* | 4/2015 | Hayakawa | G06K 15/408 358/1.14 |
| 2016/0224279 A1 | 8/2016 | Kim et al. | |
| 2017/0171399 A1* | 6/2017 | Yamada | G06F 3/1287 |

FOREIGN PATENT DOCUMENTS

| | | | | |
|---|---|---|---|---|
| JP | 20180049416 A | 3/2018 | | |
| JP | 20180089797 A | 6/2018 | | |
| WO | WO-0140926 A1 * | 6/2001 | | B41J 3/445 |
| WO | WO-2013059190 A1 | 4/2013 | | |

* cited by examiner

| HP for Box | HP for Dropbox | HP for Clio | Copy |
| Scan | Print | | |

(b)

Sign In

User Name

[user1]

Password

[*******]

[Cancel] [Sign in]

(c)

User1

Link Accounts

Welcom, user1
By linking your device account with your HP account, you can securely access your apps with a single sign-on.

[Skip] [Link]

(d)

HP Login

User Name (Email)

[user1@hp.com]

Password

[*******]

[Cancel] [Sign in]

FIG. 10
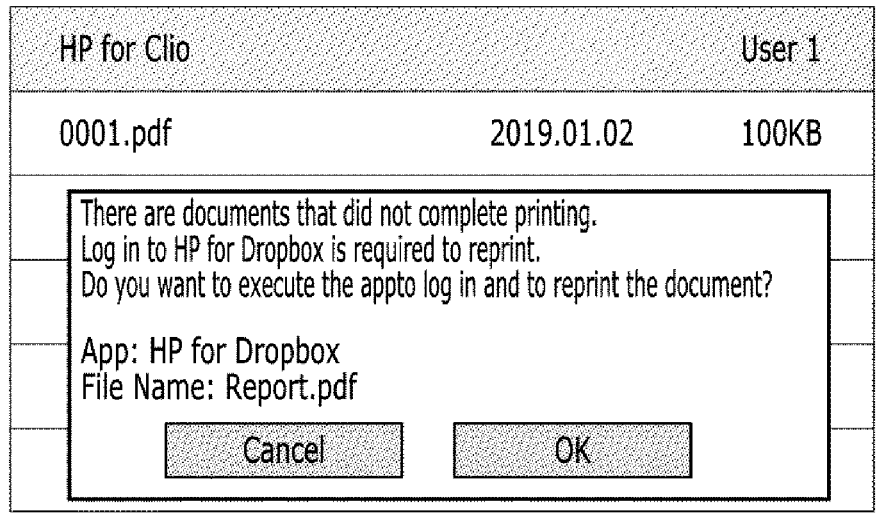
(a)
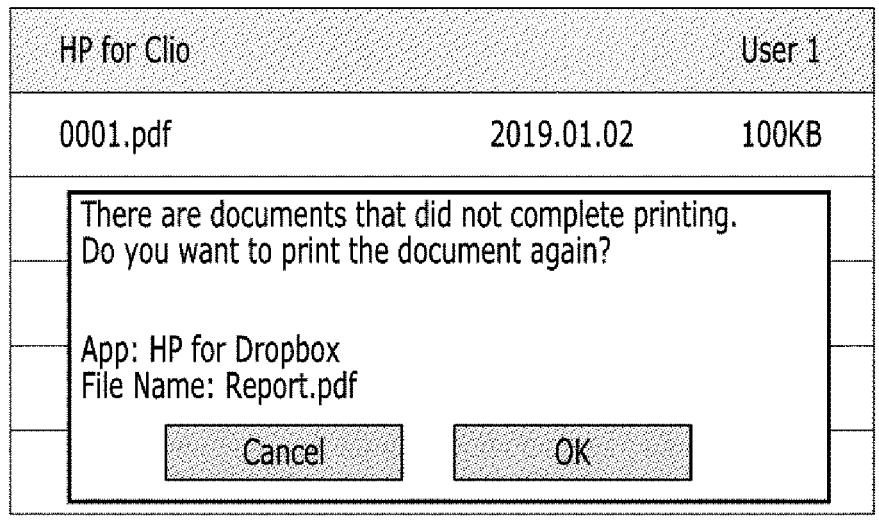
(b)

MANAGING UNRESOLVED JOBS OF DEVICES WITH CLOUD SERVER

CROSS-REFERENCE TO RELATED APPLICATIONS

This application is a U.S. National Stage Application of PCT Application No. PCT/US2020/033737, filed May 20, 2020, entitled "MANAGING UNRESOLVED JOBS OF DEVICES WITH CLOUD SERVER," which claims priority to Korean Patent Application No. 10-2019-0166763, filed Dec. 13, 2019, entitled "MANAGING UNRESOLVED JOBS OF DEVICES WITH CLOUD SERVER," each of which is incorporated herein by reference.

BACKGROUND

When user authentication using a cloud server is performed in a device, the device may manage various data of a user stored in the cloud server. For example, a device connected to a network may execute a user authentication and securely print documents and photos through the cloud server.

BRIEF DESCRIPTION OF THE DRAWINGS

Various examples will be described by referring to the accompanying drawings.

FIG. 3 illustrates a user authentication interface in a device according to an example.

FIG. 10 illustrates a notification window of an unresolved print job according to an example.

DETAILED DESCRIPTION

Figure 1:
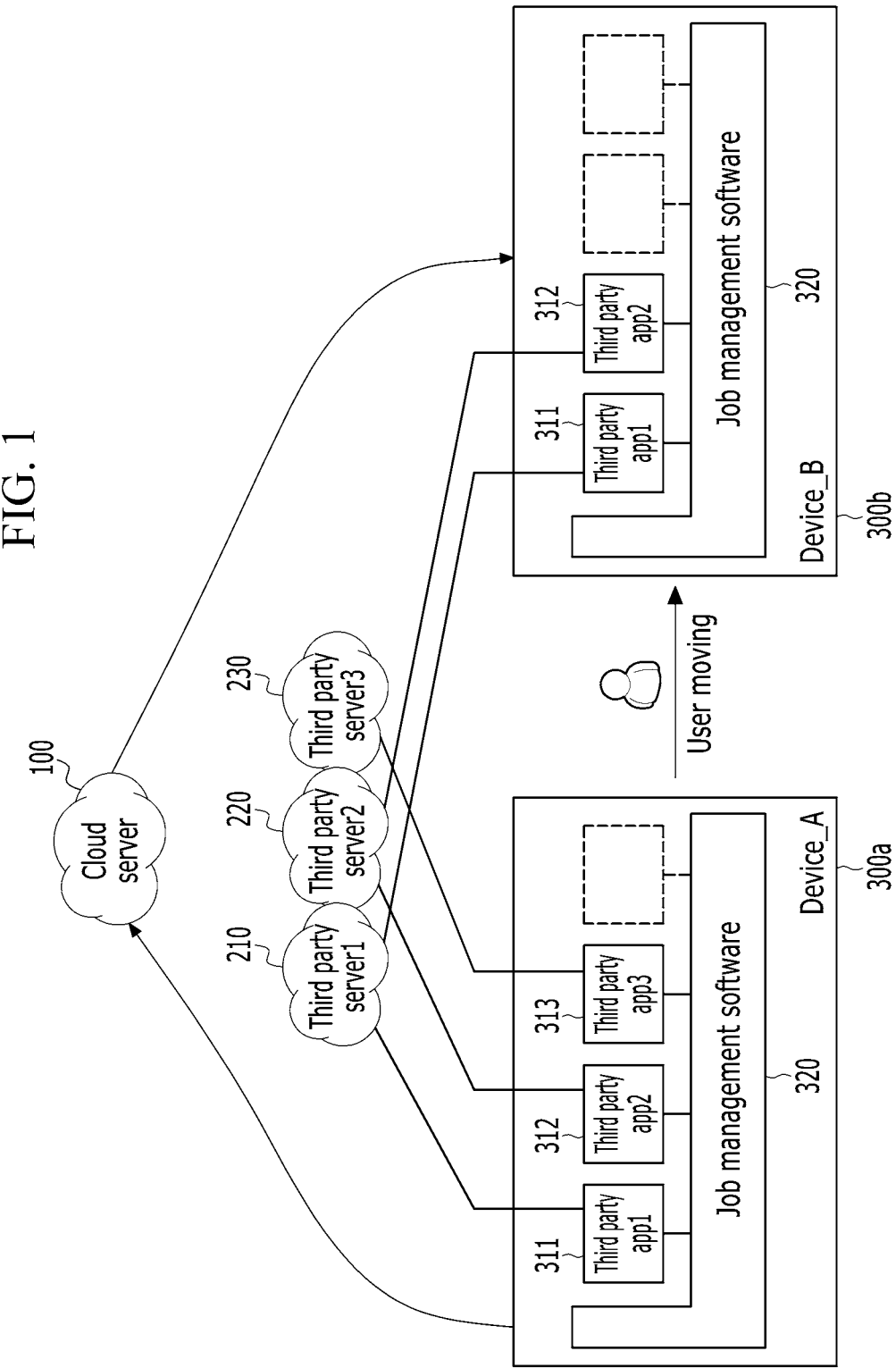
FIG. 1 illustrates a system for sharing unresolved job information among devices via a cloud server according to an example.

As those skilled in the art will realize, the following described examples may be modified in various different ways, all without departing from the spirit or scope of the present disclosure. In order to clarify the present disclosure, parts that are not relevant to the description will be omitted, and the same elements or equivalents are referred to by the same reference numerals throughout the specification.

Throughout the specification, when a part is referred to "include" a certain element, it means that it may further include other elements rather than exclude other elements, unless specifically indicated otherwise.

The devices described in the present disclosure may be implemented with hardware including at least one processor, a memory device, a communication device, and the like, and a program executed in combination with the hardware may be stored in a designated location. The hardware has a configuration and performance to implement the example methods of the present disclosure. The program includes instructions implementing the example operation methods of the present disclosure described with reference to accompanying drawings, and executes the example methods of the present disclosure in combination with hardware such as a processor, a memory device, and the like.

As used herein, the term "transmit or provide" may be used to include not only direct transmission or provision but also indirect transmission or provision through another device or by using a bypass.

The singular forms "a", "an", and "the" are intended to include the plural forms as well, unless the explicit expression such as "one" or "singular" is used.

The expression "and/or" may include each of the referred elements and every combination of one or more thereof.

In a flowchart described with reference to the accompanying drawings, the operation order may be changed, several operations may be merged, a certain operation may be divided, and a specific operation may not be executed.

An application (App) may refer to an application program that is installed and executed in a device and that is designed to directly perform a function that is specified for a user or another application. For example, the app may be a file sharing app, a document print app, a document scan app, and the like.

In an example, a third party app may be an app developed by a software developer (third party) who does not have a direct relationship with a hardware manufacturer (first party).

When communicating with a third party app, a third party server can manage third party app documents and files that are displayed by the third party app.

A job may include printing, copying, faxing, or scanning documents via a device. For example, a user may request a print job of documents included in the third party app. Although the print job is hereinafter described as an example of the present disclosure, the job is not limited thereto.

The device can provide various third party apps that utilize a third party application programming interface (API). When the device executes a user authentication via a cloud server, the cloud server may store and manage various data including configuration information set in an arbitrary third party app by the user.

In the case of a user who passes through user authentication using a cloud server, the device can store user data including an access token, issued during an access process to a third party server, and information after executing the third party app, in the cloud server. The user data stored in the cloud server may be shared among devices.

Currently, besides user data including the access token, a job performed through the third party app and a status thereof are not stored in the cloud server. In this case, if the job fails to be resolved due to a device error, the user may move to another device and repeat a series of operations, such as executing a third party app, downloading a document, selecting print options, attempting to print, and the like.

In various examples, information of a print job that is attempted to print, such as by downloading a file stored in a third party server through a third party app installed in the device, but is not properly resolved may be stored in a cloud server. The cloud server may store unresolved job information as user data. Afterward, when the user moves to another device, the cloud server informs the user by providing the other device with the unresolved job information of the document that is not properly resolved. Then, the user may conveniently resume the print job without repeating the series of operations.

Since the drawings accompanied hereto are provided for reference in describing examples of the present disclosure, the technical spirit of the present disclosure should not be construed as being limited thereto.

FIG. 1 illustrates a system for sharing unresolved job information among devices via a cloud server according to an example.

Referring to FIG. 1, when a device_A 300a receives a print job request for a document included in a third party app1 311 from a user, the device_A 300a receives the document from a third party server 210 corresponding to the third party app1 311. When the print job is unresolved, the device_A 300a transmits information of the unresolved job to a cloud server 100.

The cloud server 100 manages user data including configuration information changed by a user after executing an arbitrary third party app, and manages the received unresolved job information while being included in the user data.

When the user logs in to the cloud server 100 via another device_B 300b, the cloud server 100 informs the user by providing the device_B 300b with the unresolved job information, and makes it possible to resume the unresolved job.

Each of the cloud server 100, third party servers 210, 220, and 230 and the devices 300a and 300b is implemented as a computing device including a memory and at least one processor. The processor executes instructions of a program loaded in the memory.

The cloud server 100 stores data of third party apps 311, 312, and 313. Further, the cloud server 100 may store the unresolved job information received from the devices 300a and 300b in the user data.

The third party servers 210, 220, and 230 may be accessed via each of the third party apps 311, 312, and 313 installed in the devices 300a and 300b. The user or the third party apps 311, 312, and 313 may access each of third party servers 210, 220, and 230 through the user's login or a third party API, and may download stored documents. Download addresses, such as uniform resource locators (URLs), may be provided and accessed via the third party API.

Each of the devices 300a and 300b may include third party apps 311, 312, and 313 and job management software 320, and may be an image forming apparatus that generates, prints, receives, and transmits image data. Representative examples of the image forming apparatus may be a printer, a scanner, a copier, a fax machine, a multi-function printer implementing integrated functions of the above-described devices, and the like.

In an example, the job management software 320 may include a software development kit (SDK) for interworking with third party apps 311, 312, and 313. Hereinafter, the job management software 320 may be referred to as an "SDK module", but is not limited thereto.

The third party apps 311, 312, and 313 installed in the devices 300a and 300b may determine whether the user is authenticated via the SDK module.

The third party apps 311, 312, and 313 may store user data in the cloud server 100 or request the stored user data to be provided.

The third party apps 311, 312, and 313 may request document information stored in each of the third party servers 210, 220, and 230 via the third party APIs, and download and progress to print some documents. In addition, data scanned through the devices 300a and 300b may be transmitted to the third party servers 210, 220, and 230.

The third party apps 311, 312, and 313 may check progress status and completion status of the requested print or scan job via the SDK module, and check device status such as whether there is an error in the devices 300a and 300b, and the like.

The third party apps 311, 312, and 313 may store information of an unresolved job in the cloud server 100, when the job requested by the user is unresolved due to an error of the devices 300a or 300b.

The cloud server 100 manages the user data. Therefore, before performing the print job, a user authentication process may be performed. Hereinafter, an example authentication process using user identification information and an example method to manage user data by the cloud server 100 will be described.

Figure 2:
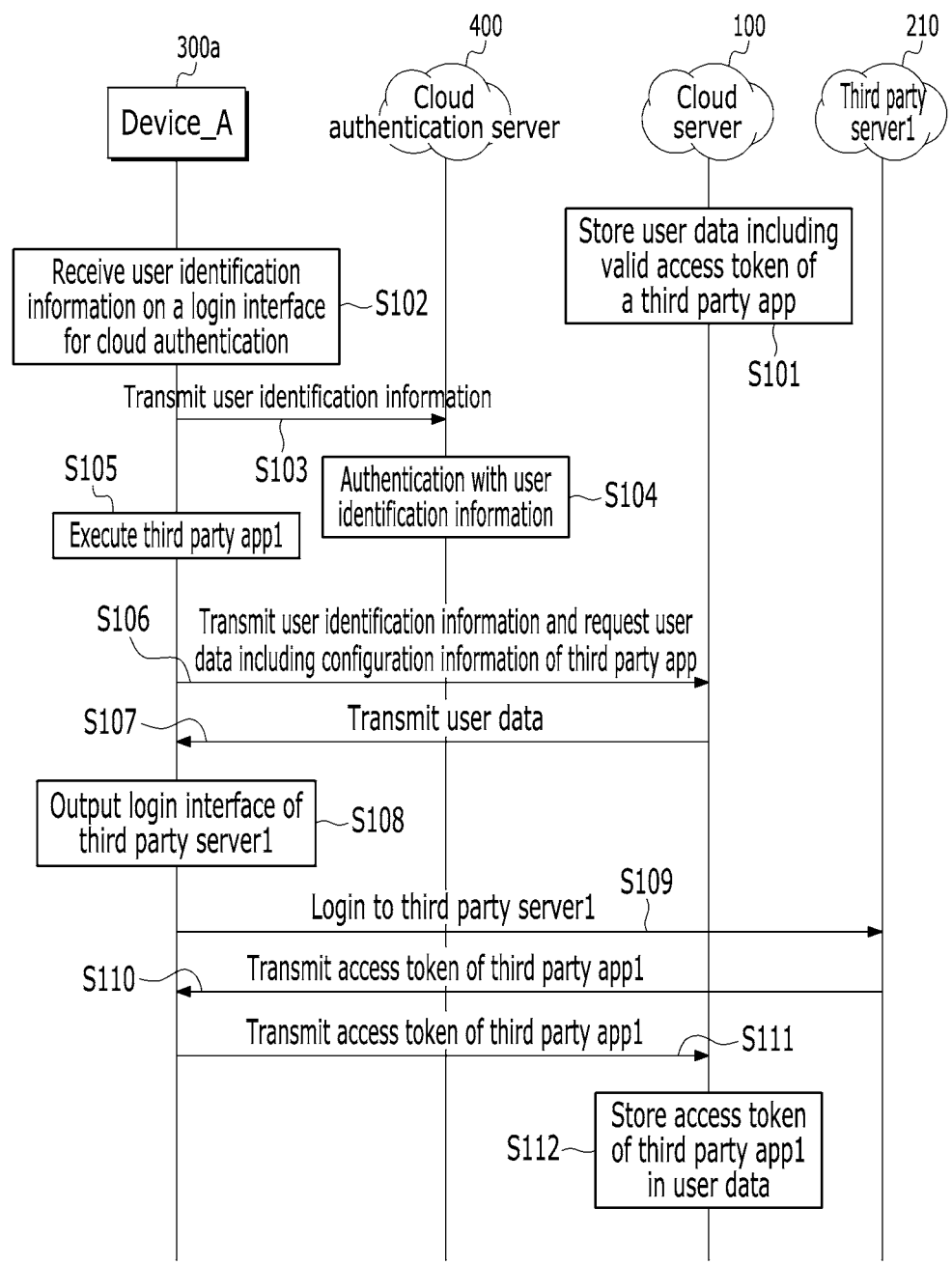
FIG. 2 illustrates operations of managing user data by a cloud server according to an example.

FIG. 2 illustrates operations of managing user data by a cloud server according to an example. FIG. 3 illustrates a user authentication interface in a device according to an example.

Referring to screen a of FIG. 3, a list of third party apps installed in the devices 300a and 300b is displayed. The displayed third party apps may be apps installed by an administrator of the devices 300a and 300b.

Referring to screen b of FIG. 3, the user may perform authentication in the devices 300a and 300b by inputting identification information registered in the devices 300a and 300b. As an example, the authentication may be performed in a device manufacturer's server, using identification information including an ID and a password.

In an example, cloud authentication is performed using user identification information registered in the cloud server 100. The user identification information may be information used when registering to the cloud server 100. For example, the user identification information may include an ID and a password in the format of a domain and may be input through the interface as illustrated in screen d of FIG. 3. After logging in to the device, the user may perform cloud authentication through the interface as illustrated in screen c of FIG. 3.

Referring to FIG. 2, the cloud server 100 stores user data including a valid access token of an arbitrary third party app and information set by the user related to the arbitrary third party app in operation S101. Accordingly, the user may use the third party app with the valid access token and configuration information of the third party app that is included in the user data stored in the cloud server 100, regardless of which of the devices 300a and 300b is used.

The user data may include the valid access token of a third party app and information set by the user related to the third party app as illustrated Table 1. In Table 1, the item "Unresolved printing job list" represents information of a target of an unresolved job, such as information stored in operation S207 of FIG. 4, and is stored while mapped to user data. If there is no unresolved job, "Unresolved printing job list" may not be included in user data.

TABLE 1

| Item | Explanation |
| --- | --- |
| Credential table | Information including access token and the like, which can call third party APIs, as a result of third party app authentication. |
| Recent search keyword list | Whether to show the saved keywords to search documents on next search |
| Recent search site list | Whether to show the saved keywords to search sites on next search |
| Do not show again flag for app guide | Whether to show app guide after entering the app |
| Do not show again flag for remember me pop up | Whether to display a pop-up that asks user whether to store data in the cloud server |
| End-user license agreement (EULA) & privacy policy (PP) agreement state | Whether to agree to EULA & PP to use third party apps |
| Unresolved printing job list | Executed third party app, document information, and the like, when a print job is not unresolved in a device. |

In Table 1, "Credential table" represents an authentication result of third party apps 311, 312, and 313. If there is a credential table of third party apps 311, 312, and 313 in the cloud server 100, the user may access documents existing in the corresponding third party apps 311, 312, and 313, without logging in to the corresponding third party apps 311, 312, and 313 in a device.

The "Credential table" includes user authentication information of third party apps 311, 312, and 313, such as an access token used for calling an API of third party apps 311, 312, and 313, authentication information in the format of an ID and a password, a session ID, or the like. Hereinafter, an example of using an access token as user authentication information will be described, but is not necessarily limited thereto.

As an example, the credential table may have a form as illustrated in Table 2 and may vary according to the types of third party apps 311, 312, and 313.

TABLE 2 accessToken
lastAccessedDate
refreshToken
refreshTokenExpireDate
tokenImportTime In Table 2, the access token may be an access right of a user issued from a third party server 210, 220, or 230. If a valid access token exists in the cloud server 100, access to a document from the third party servers 210, 220, and 230 may be performed by using the access token of the cloud server without an additional authentication process. Such a process may be referred to as "sign in once," an example of which will be described with reference to FIG. 9.

In an example, the "lastAccessedDate" is the date when the user last accessed a third party app, the "refreshToken" is a token used to obtain a valid access token again after the access token expires, the "refreshTokenExpireDate" is the date when a refreshToken expires, and the "TokenImportTime" is the time when a valid access token was issued.

Referring again to FIG. 2, the device_A 300*a* receives user identification information in the login interface for cloud authentication in operation S102.

As an example, after logging in to the device on the interface as illustrated in screen b of FIG. 3, access to the cloud server 100 is performed through the interface as illustrated in screen c of FIG. 3. The device_A 300*a* receives user identification information through the interface as shown in screen d of FIG. 3.

The device_A 300*a* transmits the user identification information received as shown in screen d of FIG. 3 to a cloud authentication server 400 in operation S103.

The cloud authentication server 400 authenticates with user identification information in operation S104.

After the authentication succeeds, the user executes the third party app1 311 in operation S105. As an example, the user may execute HP for Dropbox.

The executed third party app1 311 transmits user identification information to the cloud server 100 in operation S106 and receives user data corresponding to the user identification information in operation S107. Hereinafter, an example in which the user authentication information of the third party app1 311 does not exist in the received user data will be described.

Since the user data does not include user authentication information of the third party app1 311, the device_A 300*a* provides an interface for requesting the user to log in to the third party server1 210 in operation S108.

The device_A 300*a* logs in to the third party server1 210 of the third party app1 311 using information input by the user in operation S109.

The third party server1 210 transmits an access token of the third party app1 311 to the device_A 300*a* in operation S110.

The device_A 300*a* transmits the access token of the third party app1 311 to the cloud server 100 in operation S111.

The cloud server 100 stores the access token of the third party app1 311 in the user data in operation S112. For example, the cloud server 100 may store a credential table including an access token as illustrated in Table 2.

In various examples, the operations S108 to S112 may be omitted when the received user data includes user authentication information of the third party app1 311.

Hereinafter, an example process in which a user having access rights to the cloud server 100 requests a print job and the cloud server stores and manages unresolved job information when the print job is unresolved will be described.

Figure 4:
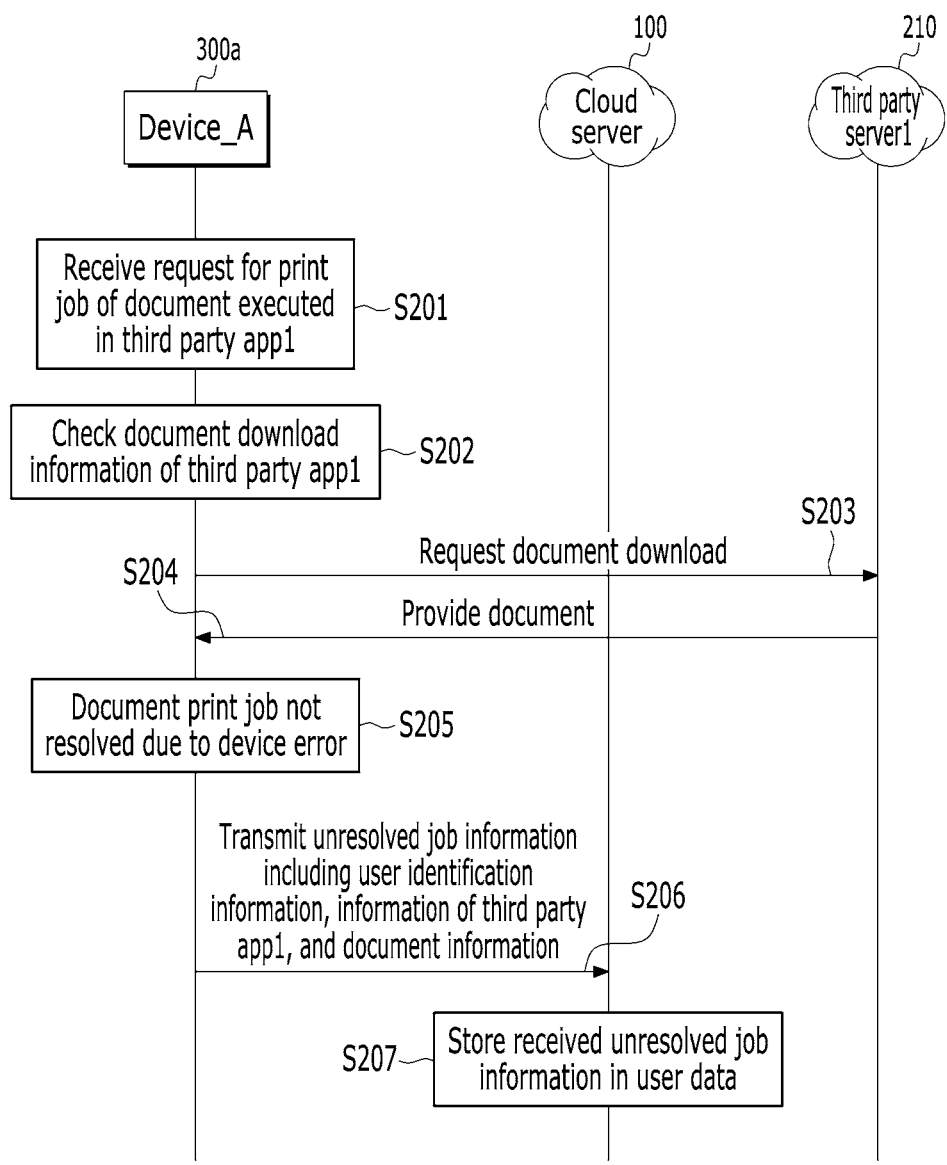
FIG. 4 illustrates operations to store unresolved job information by a cloud server according to an example.

FIG. 4 illustrates operations to store unresolved job information by a cloud server according to an example.

Referring to FIG. 4, a device_A 300*a* receives a print job request for a document executed in a third party app1 311 from a user in operation S201.

The device_A 300*a* identifies document download information of the third party app1 311 using an access token in operation S202. The document download information may be a uniform resource locator (URL) where documents can be downloaded without user authentication information, or document identification information such as a file path, a name of the document that can be downloaded using user authentication information (e.g., access token), and the like.

As an example, since a third party app2 312 cannot directly access and print a document executed in the third party app1 311, in order to download the document, the third party app2 312 may call a document download API to a server of the third party app1 311 by using the access token and the document identification information.

As another example, if there is a URL for directly downloading the document of an unresolved job executed in the third party app1 311, the document may be downloaded without the user authentication information of the third party app1 311.

The device_A 300a requests a third party server1 210 to download the document in operation S203 and receives the requested document from the third party server1 210 in operation S204.

The device_A 300a executes the print job of the document but is terminated without properly completing the print job of the document due to an error in operation S205.

The device_A 300a transmits unresolved job information including user identification information, third party app1 311 information including the document, and information of the document for which a print job is requested, to the cloud server 100 in operation S206. In an example, the unresolved job information transmitted by the device_A 300a may include information of the third party app1 311, information of the document requested to be printed, a download URL or a third party API for downloading the document, a cause of the unresolved job, status of the device_A 300a, and the like. An example of unresolved job information is illustrated in Table 3.

TABLE 3

| Item | Explanation |
| --- | --- |
| Third party app Information | Information of third party apps that tried to print |
| Document download information | URL for downloading a document without an access token, or third party API including document identification information for downloading corresponding document with access token |
| Job status | Whether a job is resolved, total pages, printed pages, print options, and the like |
| Device status | Condition to make a print job unresolved |
| User check status of unresolved job | If the app is not installed in the device and is required to be installed, whether the user confirms the app installation |

Referring to Table 3, the user check status of unresolved job may include a status in which the user has confirmed to install the third party app1 311, when the app required for the job is not installed in the device_A 300a. An example of the user check status is provided with reference to FIG. 11.

An example of the unresolved job information in which the third party app1 311 is HP for Dropbox is illustrated in Table 4.

TABLE 4

| Item | Explanation |
| --- | --- |
| Third party app Information | Name: HP for Dropbox<br>Package name:<br>com.hp.print.horizontalconnector.dropbox |
| Document information | Filename: 0809homework.pdf<br>File path: /Homework/math/0809homework.pdf |
| Document download third party API | API: https://content.dropboxapi.com/2/files/download<br>Example:<br>curl -X POST<br>https://content.dropboxapi.com/2/files/download\<br>--header "Authorization: Bearer"\<br>--header "Dropbox-API-Arg: {\"path\":<br>\"/Homework/math/0809homework.pdf\"}" |
| Job status | Job status: canceled with error<br>Printed pages: 2 pages<br>Total Pages: 5 pages<br>Print Options: Color, 2 copies, A4, Plain |
| Device status | No toner |

Referring again to FIG. 4, the cloud server 100 stores the unresolved job information received from the device_A 300a in the stored user data in operation S207. As an example, the unresolved job information of Table 3 may be added to user data mapped to user identification information having an ID of "user1@hp.com".

If the print job is unresolved in the device_A 300a, the user can move to another device to print again. Hereinafter, an example in which the user moves to the device_B 300b will be described.

Figure 5:
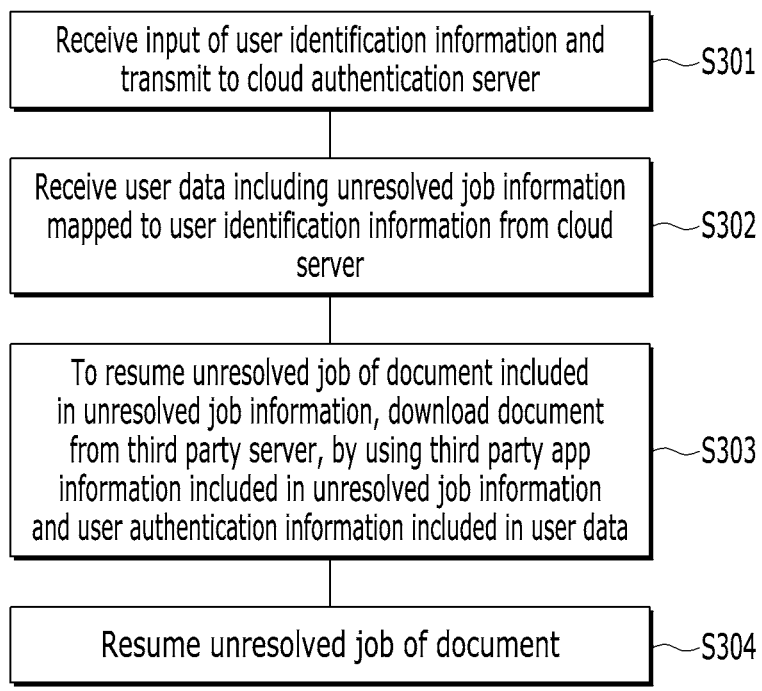
FIG. 5 illustrates an operation of resuming an unresolved job by a device according to an example.
Figure 6:
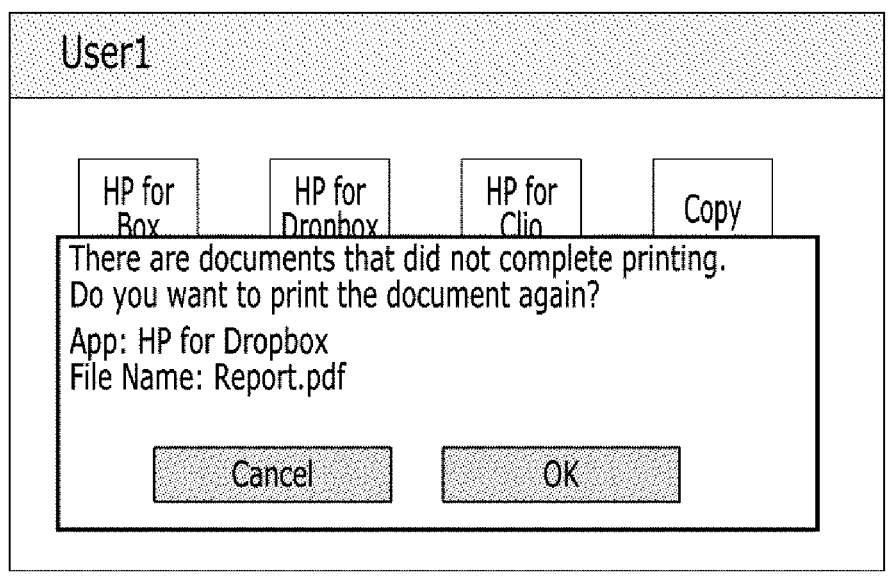
FIG. 6 illustrates a notification window of an unresolved print job according to an example.

FIG. 5 illustrates an operation of resuming an unresolved job by a device according to an example. FIG. 6 illustrates a notification window of an unresolved print job according to an example.

Referring to FIG. 5, the user moves to device_B 300b, and device_B 300b transmits the received user identification information to a cloud authentication server 400 in operation S301.

If the authentication is successful, the device_B 300b receives the unresolved job information of the user from a cloud server 100 in operation S302. In an example, the unresolved job information may be information stored in operation S207 of FIG. 4. Further, the device_B 300b may receive the user data stored in operation S112 of FIG. 2, together with the unresolved job information.

As an example, the device_B 300b may notify the user that there is a document of the unresolved job and receive confirmation of whether to resume the unresolved job. As an example, the device_B 300b may display a pop-up window as illustrated in FIG. 6.

With the user authentication information of the third party app1 311 included in the user data, the device_B 300b calls a document download API of the third party app1 311 included in the unresolved job information and downloads the unresolved document from a third party server1 210 in operation S303. As an example, the user authentication information may be an access token of the third party app1 311. If the user data of Table 3 includes a URL for directly downloading the document of the unresolved job, the document can be downloaded without calling a document download API.

The device_B 300b progresses to reprint the downloaded unresolved document in operation S304. As an example, the third party app1 311 of the device_B 300b may send a request for a print job to an SDK module. If the print job is properly resolved, the cloud server 100 may delete the stored corresponding unresolved job information.

Hereinafter, when a print job of a document executed in the third party app1 311 in the device_A 300a is not completed, an example in which a user moves to the device_B 300b, acquires an access right to the cloud server 100, and executes the third party app1 311 or a third party app2 312 will be described.

Figure 7:
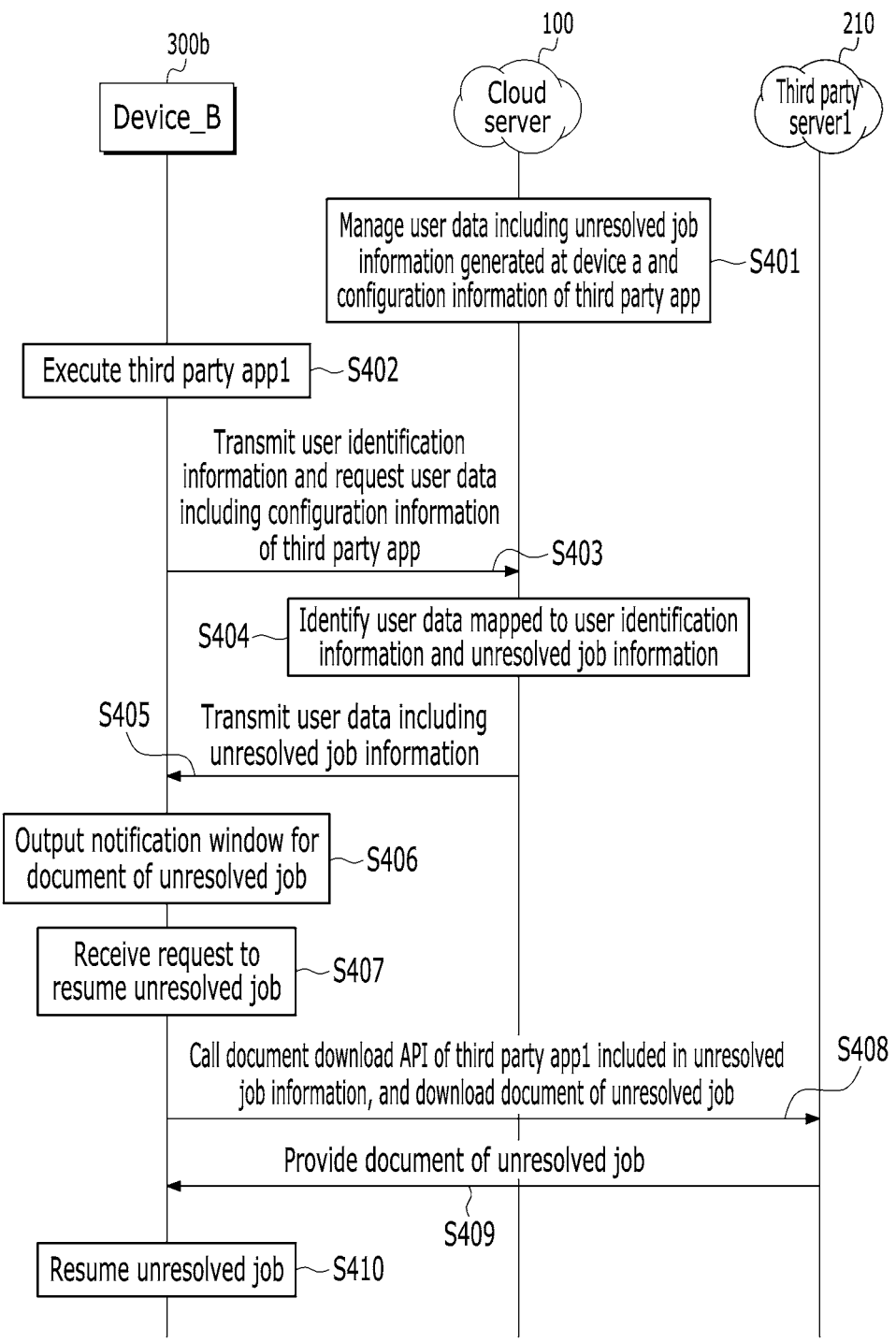
FIG. 7 illustrates an operation of resuming an unresolved print job according to an example.
Figure 8:
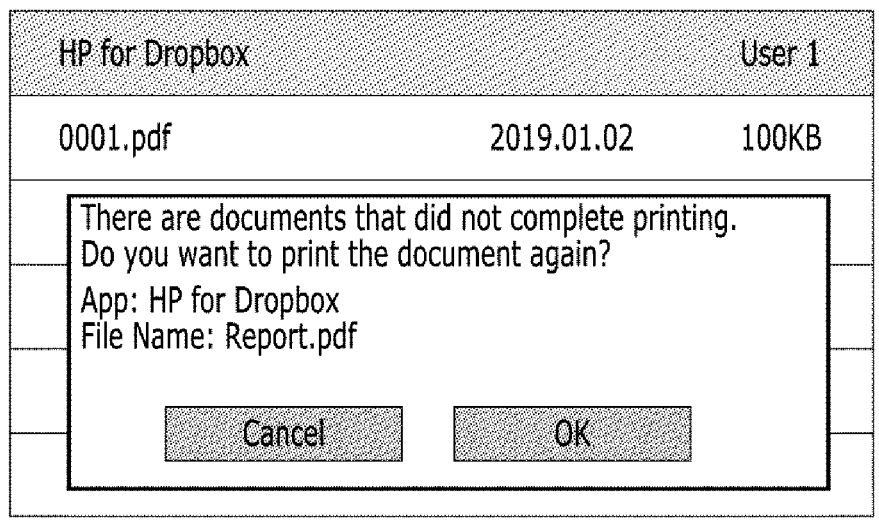
FIG. 8 illustrates a notification window of an unresolved print job according to an example.

FIG. 7 illustrates an operation of resuming an unresolved print job according to an example, and FIG. 8 illustrates a notification window of an unresolved print job according to an example.

Referring to FIG. 7, the cloud server 100 manages user data in operation S401. As an example, the user data may include configuration information of a third party app set by the user and unresolved job information received from the device_A 300a.

The device_B 300b executes a third party app1 311 in operation S402.

The device_B 300b transmits user identification information to a cloud server 100 and requests user data corresponding to the user identification information in operation S403. In this case, the device_B 300b may send the request through the third party app1 311.

In operation S404, the cloud server 100 identifies user data mapped to the received user identification information among the user data being managed in operation S401. In operation S405, the cloud server 100 transmits the user data to the device_B 300*b*. As an example, the user data may include a credential table that contains an access token of the third party app1 311. Further, unresolved job information on the print job of the document executed in the third party app1 311 may be included.

In operation S406, the device_B 300*b* identifies that the received user data includes the unresolved job information and outputs information about the document of the unresolved job to the currently executed third party app1 311 in a notification window. As an example, the device_B 300*b* may display a pop-up window as illustrated in FIG. 8. Referring to FIG. 8, the third party app1 311 currently executed in the device_B 300*b* is HP for Dropbox, and a document of the unresolved job is also included in HP for Dropbox.

The device_B 300*b* receives a request to resume the unresolved job for the document from the user in operation S407.

The device_B 300*b* calls the document download API using access information of the third party app1 311 in operation S408 and downloads the document of the unresolved job from the third party server1 210 in operation S409. The access information may be information including user authentication information, a download API of the document, and identification information of the document, and represents information required for downloading a document of the third party app1 311.

If the user data received in operation S405 includes a URL for directly downloading the document of the unresolved job, the document may be downloaded without calling the document download API of the third-party app1 311. As an example, an access token included in the user authentication information may be used for calling an API.

The device_B 300*b* that received the document of the unresolved job performs the print job of the document in operation S410. As an example, the third party app1 311 of the device_B 300*b* may send a request for the print job on an SDK module. After the job is properly resolved, the cloud server 100 may delete the stored unresolved job information.

Figure 9:
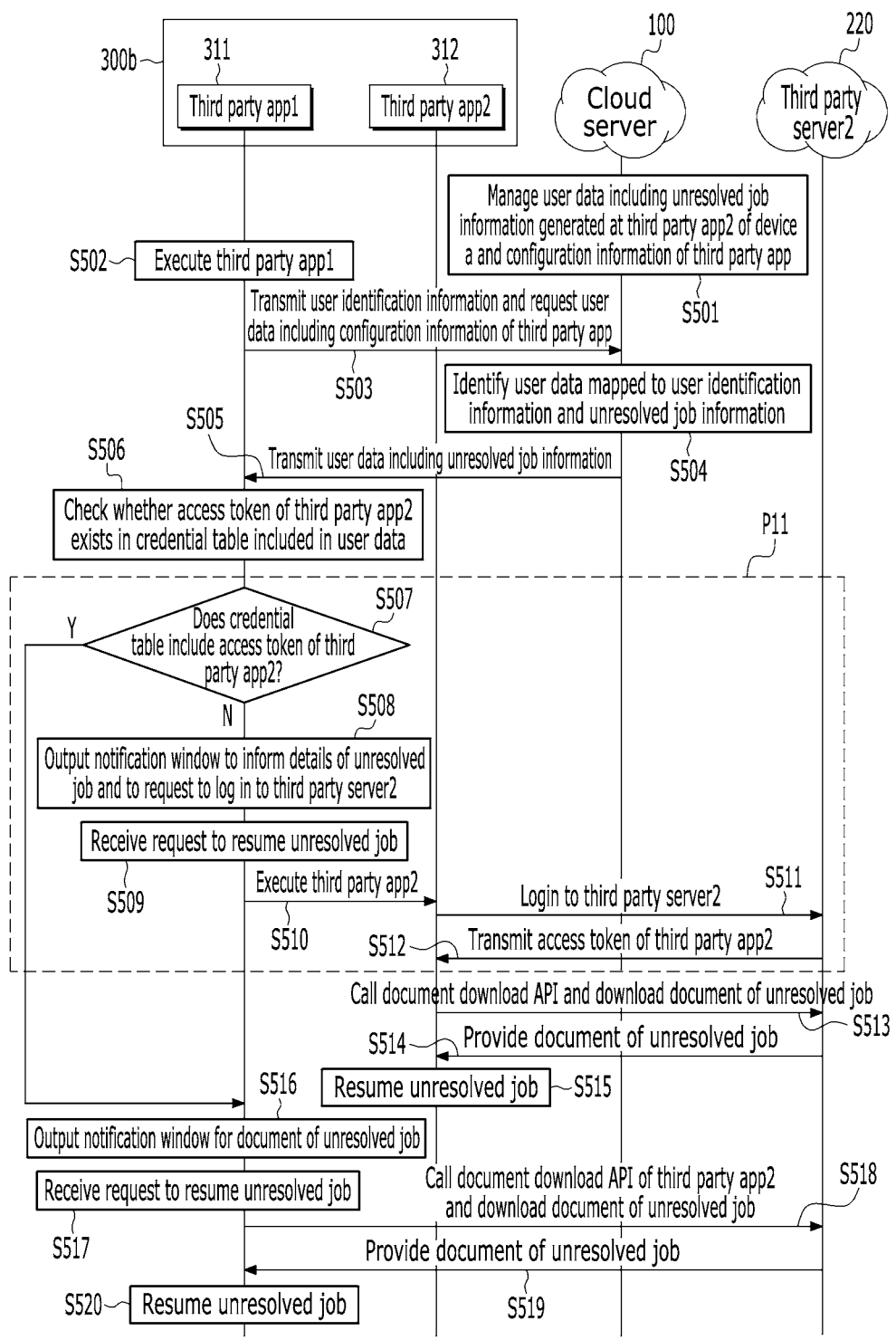
FIG. 9 illustrates an operation of resuming an unresolved print job according to an example.

FIG. 9 illustrates an operation of resuming an unresolved print job according to an example, and FIG. 10 illustrates a notification window of an unresolved print job according to an example.

Referring to FIG. 9, a cloud server 100 manages user data including unresolved job information and configuration information of a third party app in operation S501. As an example, the user data, the configuration information of the third party app, and the unresolved job information may be information received from a third party app2 312 of a device_A 300*a*.

A device_B 300*b* executes a third party app1 311 in operation S502.

The third party app1 311 transmits user identification information to the cloud server 100 and requests user data including configuration information of the third party app in operation S503.

In operation S504, the cloud server 100 identifies user data mapped to the received user identification information among the user data being managed in operation S501. In operation S505, the cloud server 100 transmits the user data to the device_B 300*b*. As an example, the user data may include a credential table including an access token of the third party app1 311. Here, the user data may include unresolved job information of a print job of a document executed in the third party app2 312.

In order to download the document of the unresolved job included in the third party app2 312, the third party app1 311 checks whether the access token of the third party app2 312 is contained in a credential table included in the received user data in operation S506. Although the access token is described as an example, it may also be checked whether another form of user authentication information is contained in a credential table included in the received user data.

If it is determined that the access token of the third party app2 312 is not included in the user data in operation S507, the third party app1 311 notifies the user that there is a document of the unresolved job and that the login to the third party server2 220 is required for re-executing the corresponding document in operation S508. Referring to screen a of FIG. 10, the device_B 300*b* may display a pop-up window. As an example, the third party app1 311 currently executed on the device_B 300*b* is HP for Clio, and the document of the unresolved job is included in the third party app2 312 that is, HP for Dropbox.

The third party app1 311 receives a request to resume the unresolved job from a user in operation S509.

The third party app1 311 executes the third party app2 312 in operation S510.

In operation S511, the third party app2 312 receives login information of the third party server2 220 from the user to log in to the third party server2 220. In operation S512, the third party app2 312 receives the access token of the third party app2 312. Here, the third party app2 312 may transmit the access token to the cloud server 100.

In operations S513, the executed third party app2 312 calls a document download API using user authentication information. In operation S514, the executed third party app2 312 is provided a document of the unresolved job through downloading. As an example, an access token included in the user authentication information may be used for calling the API.

If the user data received in operation S505 includes a URL for directly downloading the document of the unresolved job, the document may be directly downloaded from the URL while omitting the operations from S508 to S512 where the access token of the third party app2 312 is acquired.

The third party app2 312 performs a print job of the document in operation S515. As an example, the third party app2 312 may send a request for the print job to an SDK module, and after resolving the job, the cloud server 100 may delete the stored unresolved job information.

On the other hand, if the user data includes the access token of the third party app2 312, since the third party server2 220 may be accessed using the access token, the user is not required to repeatedly log in to the third party server2 220. In an example, a function as such may be referred to as "sign-in-once", and operations included in P11 of FIG. 9 may be omitted by using sign-in-once.

If it is determined that the user data includes the access token of the third party app2 312 in operation S507, the third party app1 311 outputs a notification window notifying that there is a document of an unresolved job in operation S516. As an example, a pop-up window such as shown in screen b of FIG. 10 may be displayed. Referring to screen b of FIG. 10, the third party app1 311 currently executed in the device_B 300*b* is HP for Clio and the document of the unresolved job is included in HP for Dropbox.

The third party app1 311 receives a request to resume the unresolved job of the document from the user in operation S517.

By the sign-in-once function, the third-party app1 311 calls the document download API of the third party app2 312 using the user authentication information of the third party app2 312 included in the user data in operation S518. In operation S519, the third-party app1 311 is provided the document of the unresolved job through downloading.

In operation S520, the third party app1 311 performs a print job of the document. As an example, the third party app1 311 may send a request for the print job to an SDK module. After resolving the job, the cloud server 100 may delete the stored unresolved job information.

Hereinafter, an example in which a third party app2 312 is not installed in a device_B 300b and user data does not include user authentication information such as an access token of the third party app2 312 will be described.

Figure 11:
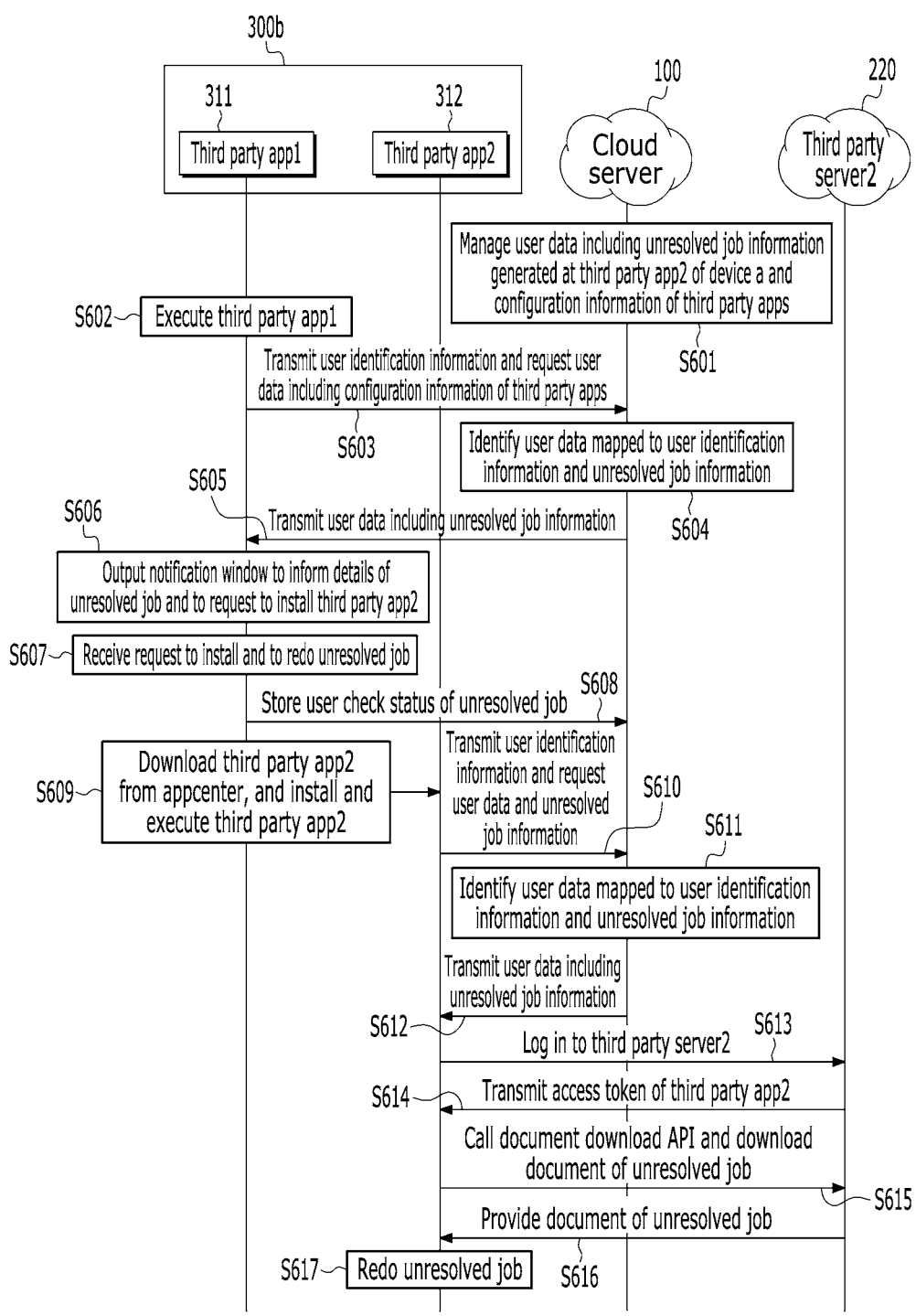
FIG. 11 illustrates an operation of resuming an unresolved print job according to an example.
Figure 12:
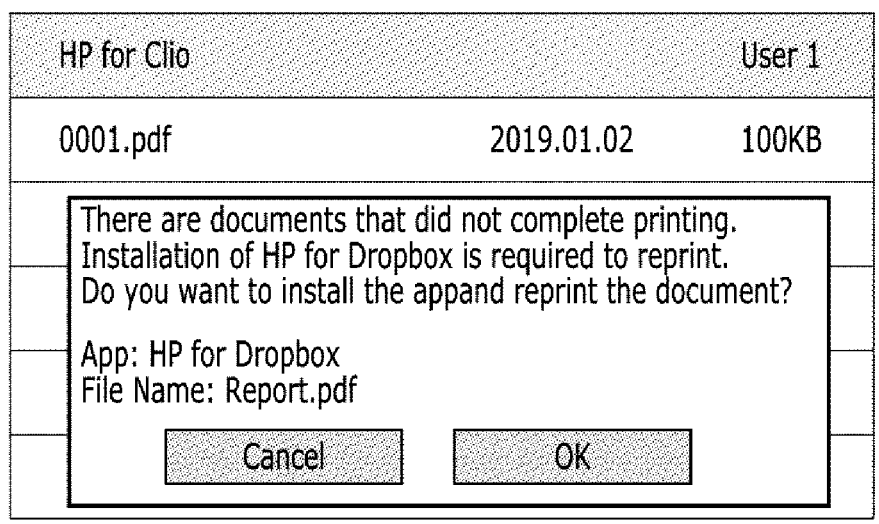
FIG. 12 illustrates a notification window of an unresolved print job according to an example.

FIG. 11 illustrates an operation of resuming an unresolved print job according to an example, and FIG. 12 illustrates a notification window of an unresolved print job according to an example.

Referring to FIG. 11, a cloud server 100 manages user data including unresolved job information and configuration information of a third party app in operation S601. As an example, the unresolved job information may be information received from a third party app2 312 of a device_A 300a.

A device_B 300b executes a third party app1 311 in operation S602.

The third party app1 311 transmits user identification information to the cloud server 100 and requests user data including configuration information of the third party app in operation S603.

In operation S604, the cloud server 100 identifies user data mapped to the received user identification information among the user data being managed in operation S601. In operation S605, the cloud server 100 transmits the user data to the device_B 300b. As an example, the user data may include a credential table that contains an access token of the third party app1 311. Here, the user data may include unresolved job information informing that the unresolved job is a print job of a document executed in the third party app2 312.

The third party app1 311 notifies the user that the third party app2 312 includes a document of an unresolved job, and receives a confirmation on whether to install the third party app2 312, since the third party app2 312 is not installed in the device_B 300b, in operation S606. As an example, a pop-up window as illustrated in FIG. 12 may be displayed.

Referring to FIG. 12, the third party app1 311 currently executed in the device_B 300b is HP for Clio, and the document of the uncompleted job is included in the third party app2 312 (that is, HP for Dropbox). The user data received by the cloud server 100 does not include a credential table of HP for Dropbox, and HP for Dropbox is not installed in the device_B 300b.

The third party app1 311 receives a request to redo the document of the unresolved job and to install the third part app2 312, from the user in operation S607.

In operation S608, the third party app1 311 stores, in the cloud server 100, a user check status of the unresolved job which indicates that the user has confirmed installation. As an example, the cloud server 100 may store a user check status of the unresolved job in user data being managed in operation S601.

If installation of the third party app2 312 is required, the third party app2 312 is downloaded to the device_B 300b from an app center and is installed and executed in operation S609. The app center may be a server from which third party apps can be downloaded.

The third party app2 312 transmits user identification information to the cloud server 100 and requests user data and unresolved job information in operation S610.

In operation S611, the cloud server 100 identifies user data mapped to the received user identification information and the unresolved job information. In operation S612, the cloud server 100 transmits the user data to the device_B 300b. In an example, the user data of operation S611 may include user check status of the unresolved job of operation S608.

In operation S613, the third party app2 312 requests the user to log in and allows the user to log in to the third party server2 220. In operation S614, the third party app2 312 receives an access token of the third party app2 312 from the third party server2 220. In an example, the third party app2 312 may transmit the received access token to the cloud server 100.

In operation S615, the third party app2 312 calls a document download API using user authentication information. In operation S616, the third party app2 312 downloads the document of the unresolved job from the third party server2 220. As an example, the access token included in the user authentication information may be used when calling the API.

The third party app2 312 performs the print job of the document in operation S617. As an example, third party app2 312 may send a request for the print job to a job management software 320. After resolving the job, the cloud server 100 may delete the stored unresolved job information.

Figure 13:
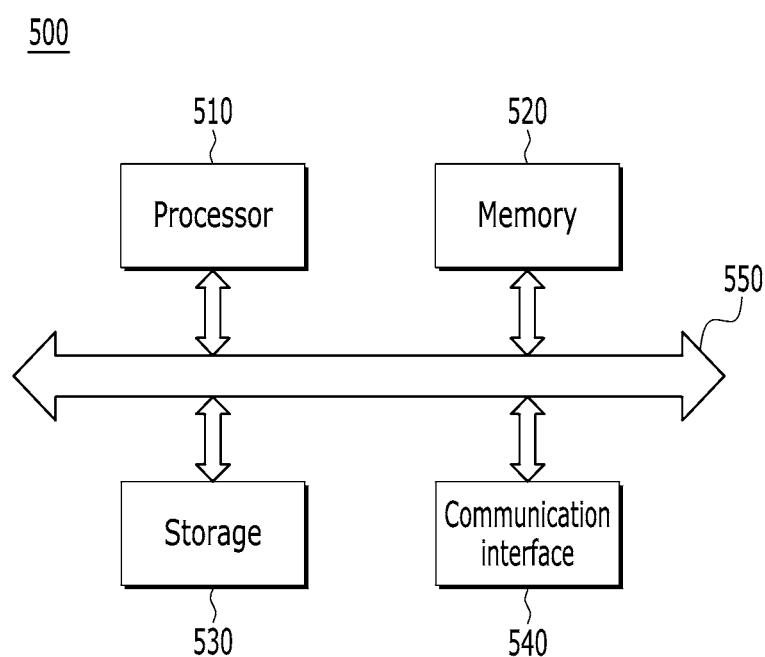
FIG. 13 illustrates a computing device according to an example.

FIG. 13 illustrates a computing device according to an example.

Referring to FIG. 13, each of the cloud server 100 and the third party servers 210, 220, and 230 described above with reference to FIG. 1 to FIG. 12 may execute a program including instructions that are described to perform operations of the present disclosure in a computing device 500 driven by at least one processor. Each of the cloud server 100 and the devices 300a and 300b may be implemented as the computing device 500 and equipped with hardware and software that to perform functions of a corresponding device.

The hardware of the computing device 500 may include at least one processor 510, a memory 520, a storage 530, a communication interface 540, and may be connected via a bus 550. In addition, hardware such as an input device, an output device, and the like may be included.

The computing device 500 may be equipped with various software including an operating system and firmware, which can execute a program.

The processor 510 is a device for controlling operations of the computing device 500 and may include various types of processors for processing instructions included in a program. For example, the processor 510 may be a central processing unit (CPU), a microprocessor unit (MPU), a micro controller unit (MCU), a graphic processing unit (GPU), and the like.

The memory 520 may load a program such that the instructions described to perform example operations of the present disclosure are processed by the processor 510. The memory 520 may be, for example, a read only memory (ROM), a random access memory (RAM), and the like. The storage 530 may store various data, programs, and the like that are required to execute example operations of the present disclosure. The communication interface 540 may be a wired/wireless communication module.

According to an example of the present disclosure, when a job is not resolved due to a device error, an inconvenience in which the user repeats the same processes for redoing the unresolved job after moving to another device can be reduced. Since the cloud server stores and manages the status of the unresolved print job and information about the document of the unresolved job due to the device error, all devices may share information of unresolved jobs and resuming the print job may be easily performed by displaying a pop-up window for providing corresponding information to the user.

Although examples have been described above, the present disclosure is not limited thereto, and the present disclosure may be modified in various ways within the scope of the claims and the detailed description and accompanying drawings of the disclosure, which fall within the scope of the present disclosure.

What is claimed is:

1. A method of operating a cloud server device executed by at least one processor, the method comprising:
receiving unresolved job information about an unresolved job, requested by user identification information of a third party application, from a first device;
storing, in a cloud server, the unresolved job information in user data of the user identification information;
receiving the user identification information of the third party application and user authentication information of the third party application from a second device; and
providing, from the cloud server, the unresolved job information stored in the user data to the second device which is used to perform the unresolved job.

2. The method of claim 1, wherein the unresolved job information includes at least one of information of an application to provide a document of an unresolved job, a download uniform resource locator (URL) of the document, a download application programming interface (API) of the document, identification information of the document, a cause of the unresolved job, or a status of the first device.

3. The method of claim 1, further comprising:
receiving completion information of the unresolved job information from the second device; and
deleting the unresolved job information.

4. A computing device comprising:
a memory to store computer executable instructions; and
a processor to, by executing the computer executable instructions:
receive a job request for a document selected by a third party application while logged in with first user identification information,
determine whether the job is resolved, and
when the job is not properly resolved, transmit first unresolved job information including information of the document and information of the third party application to a cloud server,
wherein the first unresolved job information is stored in user data of the first user identification information.

5. The computing device of claim 4, wherein the first unresolved job information further includes at least one of a download uniform resource locator (URL) of the document, a download application programming interface (API) of the document, identification information of the document, a cause of the unresolved job, or a status of the computing device.

6. The computing device of claim 4, wherein the processor executes the computer executable instructions to:
display information of the document provided by the third party application on a screen by using user authentication information of the third party application received from the cloud server or user authentication information authenticated from a server of the third party application, and
receive a job request of the document.

7. The computing device of claim 6,
wherein the processor executes the computer executable instructions to transmit the user authentication information authenticated from the server of the third party application to the cloud server, and
wherein the user authentication information is stored in user data of the first user identification information.

8. The computing device of claim 4, wherein the processor executes the computer executable instructions to:
transmit second user identification information to the cloud server after receiving input of the second user identification information,
receive second unresolved job information stored in user data of the second user identification information from the cloud server,
upon receiving a request to redo the second unresolved job information, download a document of an unresolved job by using the second unresolved job information, and
resume the unresolved job of the downloaded document.

9. A method of operating a computing device executed by at least one processor, the method comprising:
transmitting user identification information to a cloud server;
receiving user data including unresolved job information from the cloud server;
outputting the unresolved job information to a screen;
receiving a request to redo a document of an unresolved job;
downloading the document by using download information of the document included in the unresolved job information, wherein the downloading of the document includes:
identifying a third party application providing the document based on the unresolved job information; and
when the third party application is not installed, downloading the document by installing the third party application and logging in to a server of the third party application; and
and resuming the unresolved job of the document.

10. The method of claim 9,
wherein the downloading of the document includes downloading the document by using access information of the third party application providing the document or by using a download uniform resource locator (URL) of the document, and
wherein the access information includes user authentication information required to access the third party application, and the user authentication information is information received from the cloud server or authenticated information at the server of the third party application regarding user input information.

11. The method of claim 10, further comprising:
transmitting the user authentication information authenticated at the server of the third party application to the cloud server,
wherein the user authentication information authenticated at the server of the third party application is stored in the user data of the user identification information.

12. The method of claim 9, wherein the outputting of the unresolved job information to a screen includes:
- displaying the unresolved job information while a first third party application providing a document included in the unresolved job information is executed,
- displaying the unresolved job information while a second third party application different from the first third party application is executed, or
- displaying the unresolved job information before executing the first and second third party applications.

13. The method of claim 9, further comprising transmitting completion information to the cloud server to delete the unresolved job information, when redoing the unresolved job of the document is properly completed.

* * * * *